US011940212B2

(12) United States Patent
Nichols et al.

(10) Patent No.: US 11,940,212 B2
(45) Date of Patent: *Mar. 26, 2024

(54) HEAT ENERGY DISTRIBUTION IN A CONTINUOUS DRY KILN

(71) Applicant: Weyerhaeuser NR Company, Seattle, WA (US)

(72) Inventors: Kenneth Murray Nichols, Goodyear, AZ (US); Gregory Keith Ralston, Pineville, NC (US); Luiz C. Oliveira, Vancouver (CA); Philip John Latos, Sturgeon County (CA)

(73) Assignee: Weyerhaeuser NR Company, Seattle, WA (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/465,742

(22) Filed: Sep. 2, 2021

(65) Prior Publication Data

US 2022/0155012 A1 May 19, 2022

Related U.S. Application Data

(63) Continuation of application No. 16/952,649, filed on Nov. 19, 2020, now Pat. No. 11,150,018.

(51) Int. Cl.

| | |
|---|---|
| ***F26B 15/18*** | (2006.01) |
| ***F26B 21/00*** | (2006.01) |
| ***F26B 25/22*** | (2006.01) |

(52) U.S. Cl.

CPC ............ *F26B 15/18* (2013.01); *F26B 21/004* (2013.01); *F26B 25/22* (2013.01); *F26B 2210/16* (2013.01)

(58) Field of Classification Search

CPC ........ F26B 15/18; F26B 15/12; F26B 21/004; F26B 25/22; F26B 2210/16; F26B 3/04; F26B 23/02

USPC .......................................................... 34/482

See application file for complete search history.

(56) References Cited

U.S. PATENT DOCUMENTS

| | | | | |
|---|---|---|---|---|
| 4,026,037 | A * | 5/1977 | Buchholz ............... | F26B 21/02 34/212 |
| 5,595,000 | A * | 1/1997 | Goodwin, III ........ | F26B 21/086 34/535 |
| 10,082,335 | B2 | 9/2018 | Kolari | |
| 11,150,018 | B1 | 10/2021 | Nichols et al. | |

(Continued)

*Primary Examiner* — John P McCormack

(74) *Attorney, Agent, or Firm* — Perkins Coie LLP

(57) ABSTRACT

A kiln for drying and processing lumber packages is provided. The kiln generally includes at least one end chamber, a drying chamber adjacent to the end chamber, a first lumber conveying line configured to transport the lumber packages in a first direction through the end chamber and the drying chamber, and a second lumber conveying line configured to transport the lumber packages in a second direction through the end chamber and the drying chamber. The conveying lines may be countercurrent or uniflow. The kiln may further include a heat distributor in the end chamber to distribute heat into the end chamber in addition to heat from the drying chamber along the first and second lumber conveying lines. The heat distributor may include a distribution duct receiving heat from a drying chamber distribution duct or a heater inlet duct, a heat exchanger, a radiative heating element, or a combination thereof.

8 Claims, 8 Drawing Sheets
(2 of 8 Drawing Sheet(s) Filed in Color)

(56) References Cited

U.S. PATENT DOCUMENTS

| | | | | |
|---|---|---|---|---|
| 2006/0168842 | A1* | 8/2006 | Sprague | F26B 23/002 34/396 |
| 2011/0056087 | A1 | 3/2011 | Tinsley et al. | |
| 2014/0259733 | A1 | 9/2014 | Blomquist | |
| 2019/0234686 | A1* | 8/2019 | Brodie | F26B 25/008 |

* cited by examiner

HEAT ENERGY DISTRIBUTION IN A CONTINUOUS DRY KILN

CROSS-REFERENCE TO RELATED APPLICATION(S)

The present application is a continuation of U.S. patent application Ser. No. 16/592,649, filed Nov. 19, 2020, entitled "HEAT ENERGY DISTRIBUTION IN A CONTINUOUS DRY KILN," which is hereby incorporated herein by reference in its entirety.

BACKGROUND

Continuous dry kilns are commonly used by lumber mills to dry and heat-treat dimensional lumber for use in construction and other industries. Freshly sawn lumber, often referred to as green lumber, is assembled in packages loaded into the continuous dry kiln for processing. A continuous dry kiln can be a dual path kiln, which includes two lumber conveying lines traveling either in the same direction ("unidirectional" or "uniflow") or in opposing directions ("countercurrent") through three zones of the structure. The zones include end sections at each open end of the structure for conditioning, equalization, preheating, and energy recovery and a main drying section central to the structure between the end sections. In kilns having countercurrent lines, green lumber packages enter the end sections where they are preheated by heat from the main drying section and the dried lumber exiting the drying chamber along the opposing line, allowing energy recovery. The exiting dried lumber is conditioned and equalized by absorbing a portion of the humidity released during lumber drying in the main drying section, distributing the moisture content through the volume of the dried lumber to improve moisture content uniformity and reduce the risk of drying defects such as checking, splitting, warping, cupping, etc.

Humidity released as the lumber is dried can cause extensive corrosion of the walls, floors, and components in the end sections. This often requires repair of the end sections in as few as 3-5 years of service, which increases operating costs and downtime. Venting the end sections can lower the humidity level within the end chamber, but venting alone reduces the energy recovery benefits of preheating the incoming green lumber and the conditioning and moisture equalizing benefits to the exiting dried lumber. Heat energy is typically provided to the main drying section of conventional continuous dry kilns by burning green fuel (sawdust), which creates porous carbon entrained in the hot flue gases exiting the burner, known as carryover. Carryover enters the sections of the continuous dry kiln and settles on surfaces. The porous configuration of typical carbon carryover absorbs and retains moisture, leading to further corrosion of the kiln.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
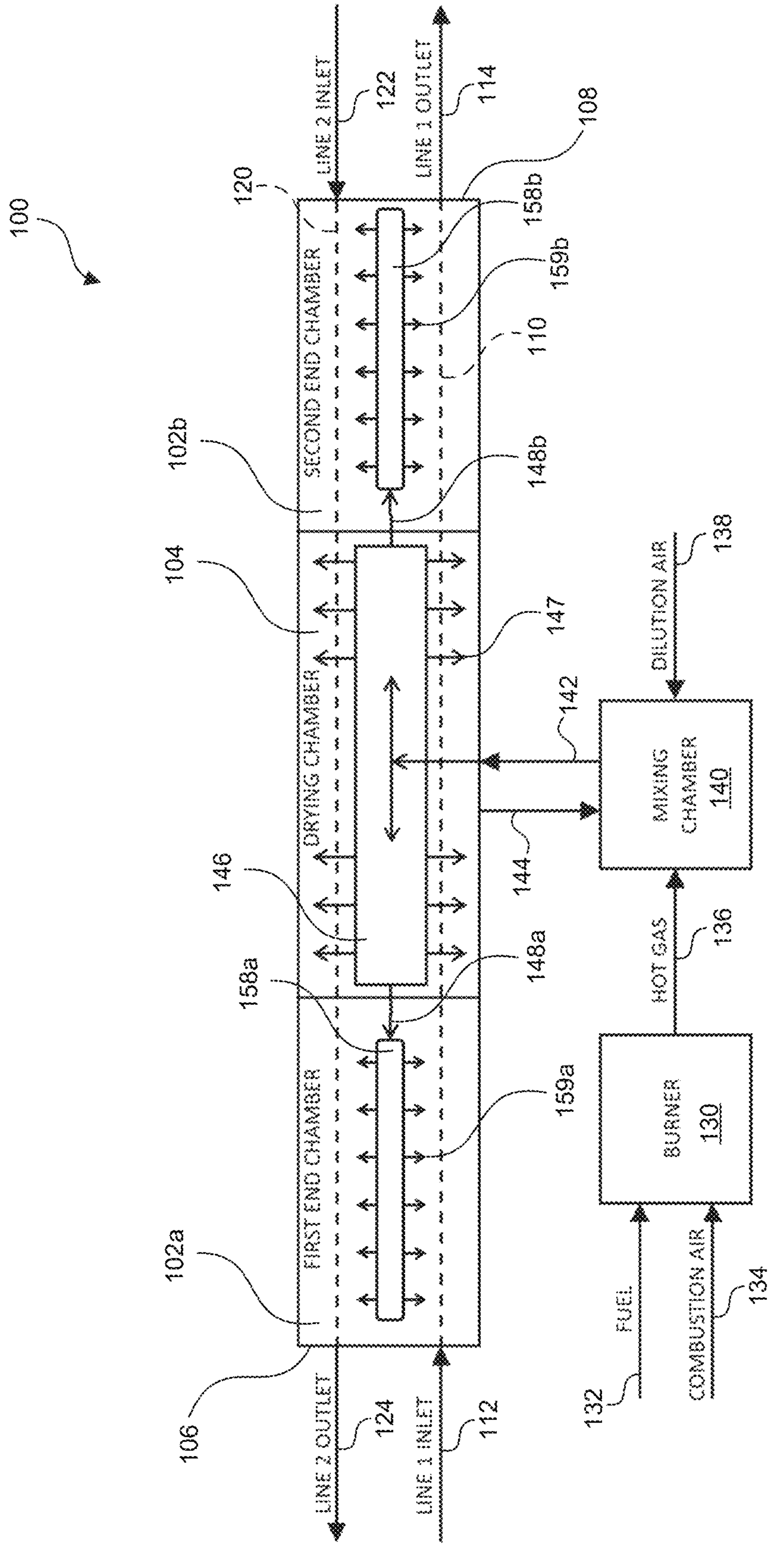
FIGS. 1A and 1B are flow diagrams of continuous dry kiln structures in accordance with embodiments of the present technology.

The technology disclosed herein relates to continuous dry kiln structures (CDK). The term "continuous dry kiln" generally refers to a green lumber processing structure having two or three zones and dual countercurrent or uniflow lumber conveying lines to transport lumber through the zones. The dual lines convey the lumber packages for drying, conditioning, and equalization of the green lumber. The term "zone" refers to a section, chamber, region, portion, etc., within the continuous dry kiln structure, including a conditioning, equalization, preheating, and energy recovery section (an "end chamber") positioned at each end of the structure and the main drying section (a "drying chamber") central to the structure. Each zone or section may define a chamber. The term "line" refers to a path, conveyor, truck, cart, dolly, etc., configured to transport lumber through the continuous dry kiln for processing. Although dual line configurations are shown and described herein, any number of conveying lines through the continuous dry kiln are suitable for use with the present technology.

The present technology includes a continuous dry kiln having a drying chamber positioned centrally between first and second end chambers at either end of the continuous dry kiln. Although not shown in the Figures, the present technology is also suitable for use with continuous dry kilns having only a single end chamber. The end chambers are configured to raise the temperature of the incoming green lumber (known as "preheating" or "energy recovery") by heat transfer from the drying chamber. In countercurrent continuous dry kilns, heat transfer from exiting processing lumber on the opposing line also contributes to preheating. Additionally, the end chambers treat the exiting processing lumber by promoting moisture transfer, both "conditioning" (e.g., relieving the residual compressive drying stresses in the lumber shell by plasticization with high temperature and high relative humidity) and "equalizing" (e.g., reducing the variation of the lumber moisture content) the exiting processing lumber. The final lumber moisture content is controlled by parameters of processing within the continuous dry kiln (e.g., line speed, green lumber package size, lumber spacing, drying chamber temperature and airflow rate, etc.).

The end chambers and components within the end chambers can experience an increased rate of corrosion during use of the continuous dry kiln. In conventional continuous dry kilns, gases in the end chambers are circulated by fans to effect the preheating of the incoming green lumber and the conditioning/equalizing of the exiting lumber. The end chambers experience a drop in dry bulb temperature as a result of the distance away from the heaters of the central drying chamber, the heat transfer into the cooler incoming green lumber in countercurrent kilns, and the proximity to the open line inlets and outlets at the ends of the kiln. The wet bulb temperature can remain substantially constant as the dry bulb temperature drops, which increases the relative humidity until the gases within the end chambers reach the dewpoint and form condensate. The green lumber contains acetic acid and other organic acids, which evaporate as gases within the kiln during heating as a portion of the hemicellulose of the lumber degrades. Such acids are contained in the condensate within the end chambers, resulting in acidic moisture contacting components of the kiln and contributing to accelerated corrosion. The porous carbon carryover from the burner contributes to acidic moisture retention of surfaces and components of the end chambers and other areas of the kiln.

The present technology is generally directed to distribution of heat energy to the end chambers of a continuous dry kiln during lumber processing, the heat energy being in addition to the heat energy entering the end chambers from the drying chamber and the heat energy carried by the heated lumber packages. The additional heat energy distribution raises the dry bulb temperature with respect to the wet bulb temperature, thereby raising the wet bulb depression and lowering the relative humidity. This reduces condensate formation in a greater portion of the end chambers than in conventional continuous dry kilns. Distribution of heat energy can be direct (e.g., by introduction of heated gases into the kiln to contact the lumber), indirect (e.g., by circulation of heated liquid or gases into heat exchangers within the kiln, by radiative heating elements, etc.), or any combination thereof. The Figures and following description show and describe embodiments of continuous dry kilns of the present technology having direct heat energy distribution (e.g., by heated gases flowing through heat distribution ducts/vents into the chambers of the kiln); however, the present technology is suitable for use with indirect heat energy distribution or a hybrid of direct and indirect. In this regard, one or more heat distributors can distribute heat energy into any of the chambers of the continuous dry kilns, e.g., by replacing one or more of the heat distribution ducts with suitable heat exchangers and/or heating elements, which can be positioned similarly to the replaced heat distribution ducts and/or be placed elsewhere within the chambers of the continuous dry kiln. In other embodiments, indirect heat energy distribution can be used in addition to the direct heat energy distribution systems within the kiln, for example, by using direct heat energy distribution in the drying chamber and indirect heat energy distribution in the end chamber(s), etc. The term "heat distributor" generally refers to any combination of direct heat energy distributors (e.g., heat distribution ducts) and indirect heat energy distributors (e.g., heat exchangers, radiative heating elements, etc.).

In embodiments of continuous dry kilns using direct heating, the additional heat energy is introduced into the end chambers through ducting and distribution vents, and the heat energy is provided by one or more heaters and/or a portion of gases that has been directed away from the dryer duct. The ducting and distribution vents can be routed to and positioned in any suitable location within the end chambers. Crossflow fans can circulate the heated gas within the end chamber. In some embodiments, the present technology includes one or more vents located in the upper region of the end chamber configured to expel moist gas from the end chamber. Gas flow through the ducting described herein can be assisted by a duct fan or other suitable flow promoter.

One or more controllers can be used with the systems described herein to control various parameters of the continuous dry kiln, e.g., the burner/heater operation, mixing, flowrates, humidity, etc., and can incorporate various suitable sensors configured to provide data to the controller as will be described in greater detail below with reference to FIG. 4. The present technology is expected to improve efficiency and production capacity by increasing control of lumber moisture, and expected to reduce repair and downtime operating costs by decreasing the rate of corrosion of components of the continuous dry kiln structure.

Figure 1B:
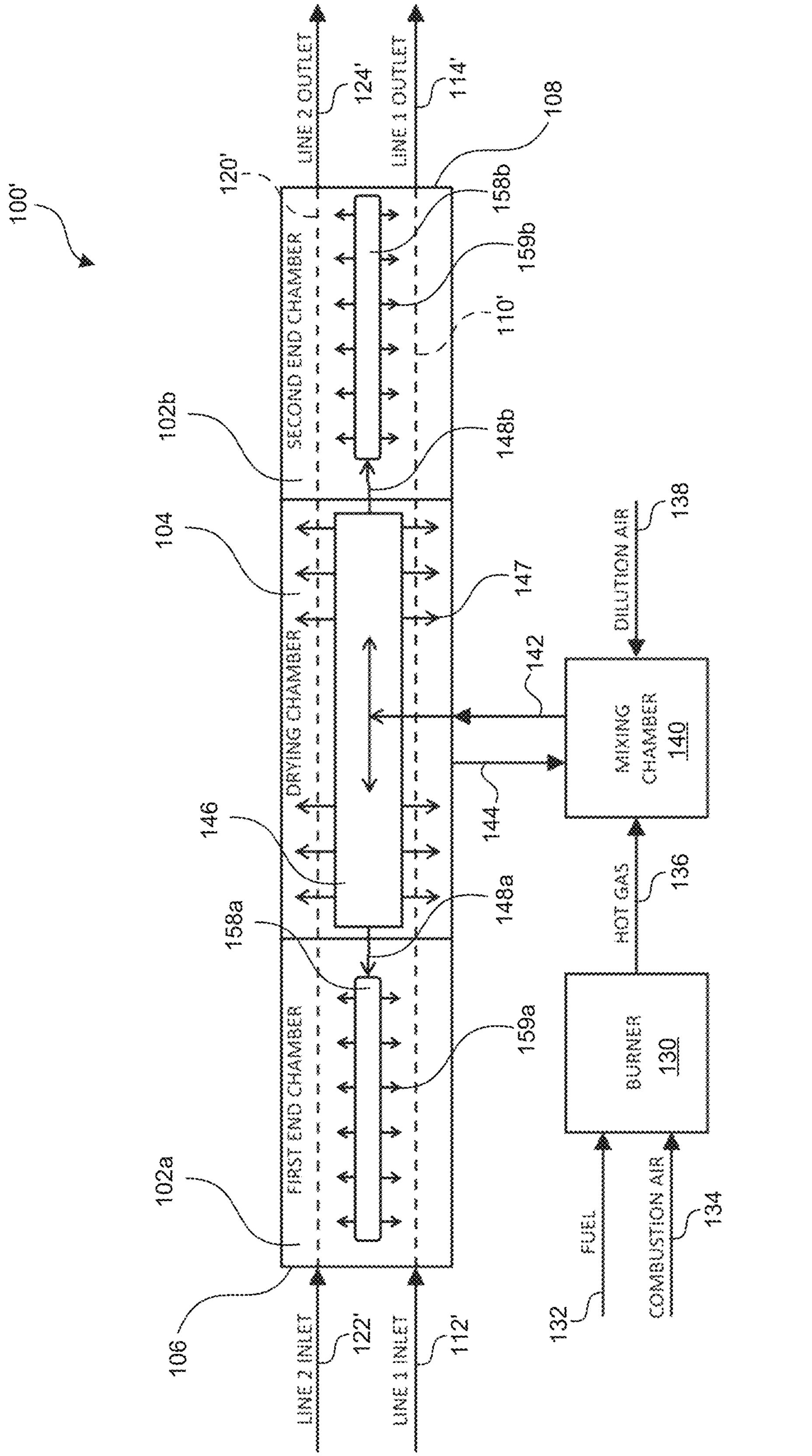

FIGS. 1A and 1B show flow diagrams of continuous dry kiln structures (FIG. 1A showing a kiln 100 having countercurrent lines, and FIG. 1B showing a kiln 100' having uniflow lines) in accordance with embodiments of the present technology. The kilns 100 and 100' include a first end chamber 102*a* at a first end 106 of the kilns 100 and 100', a second end chamber 102*b* at a second end 108 of the kilns 100 and 100', and a drying chamber 104 therebetween. Referring initially to the kiln 100 of FIG. 1A, the chambers 102*a*, 102*b*, and 104 are partitioned into dual, countercurrent lengthwise lines, including a first line 110 (moving left to right) and a second line 120 (moving right to left). The first line 110 has an inlet 112 and an outlet 114; the second line 120 has an inlet 122 and an outlet 124. The first and second lines 110 and 120 are configured to convey lumber packages (e.g., a first lumber package 111 and a second lumber package 121, see FIG. 3) through the kiln 100 during processing of the lumber packages. As shown, a lumber package placed on the first line 110 at the inlet 112 is transported first through the first end chamber 102*a*, then into the drying chamber 104, next into the second end chamber 102*b*, and exits at the outlet 114 after completing processing by the kiln 100. Similarly, a lumber package placed on the second line 120 at the inlet 122 is transported first through the second end chamber 102*b*, then into the drying chamber 104, next into the first end chamber 102*a*, and exits the outlet 124 after completing processing by the kiln 100.

Referring next to the kiln 100' of FIG. 1B, the chambers 102*a*, 102*b*, and 104 are partitioned into dual, uniflow lengthwise lines, including a first line 110' and a second line 120' (both moving left to right). The first line 110' has an inlet 112' and an outlet 114'; the second line 120' has an inlet 122' and an outlet 124'. The first and second lines 110' and 120' are configured to convey lumber packages (e.g., a first lumber package 111 and a second lumber package 121, see FIG. 3) through the kiln 100' during processing of the lumber packages. As shown, lumber packages placed on the first and second lines 110' and 120' at the inlets 112' and 122' are transported first through the first end chamber 102*a*, then into the drying chamber 104, next into the second end chamber 102*b*, and exit at the outlets 114' and 124' after completing processing by the kiln 100'.

The drying chamber 104 receives heated gas created by a burner 130 combining fuel 132 and combustion air 134. The fuel 132 can be "green fuel," generally comprising byproducts of milling processes (e.g., sawdust), or the fuel 132 can be any suitable combustible fuel, such as wood residuals, plant residuals, natural gas, propane, oil, coal, etc. Steam, hot oil, hot air, hot water, electric, solar, or other suitable heating medium may be used to provide heat (e.g., indirect heat) as an alternative embodiment to using the burner 130. The burner 130 expels a hot gas 136 into a mixing chamber 140, which can be configured to introduce a variable quantity of dilution air 138 to create a bulk drying gas of the desired temperature, moisture content, etc. After mixing the hot gas 136 and the dilution air 138, the mixture flows through an inlet duct 142 fluidly coupled to a drying chamber distribution duct 146 positioned within the drying chamber 104. In embodiments having indirect heat energy distribution, the drying chamber distribution duct 146 is omitted and replaced by a drying chamber heat distributor, e.g., one or more heat exchangers (not shown), or a combination of drying chamber distribution ducting and heat exchangers can be used. The drying chamber distribution duct 146 includes outlets exhausting drying gas 147 into the drying chamber 104 to heat and dry the lumber packages transported by the first and second lines 110 and 120. In some embodiments, gases in the drying chamber 104 can be selectively allowed to flow away from the drying chamber 104 through a backflow duct 144, returning to the mixing chamber 140.

The first and second end chambers 102*a* and 102*b* provide efficiency during processing of the lumber packages within the kilns 100 and 100'. Among other efficiencies, the first and second end chambers 102*a* and 102*b* preheat the respective green lumber packages entering the conditioning chamber with heat from the drying chamber 104, and in countercurrent kilns, forced convective heat transfer of heat energy drawn from the heated lumber package exiting the drying chamber 104. Humidity from drying the lumber packages is absorbed by and equalized within the lumber exiting the drying chamber 104, which conditions and equalizes the dried lumber before it exits the kiln. Conventional continuous dry kilns experience significant temperature drop within the end chambers because the drying gases are typically confined within the drying chamber, the ends of the kiln are open to the surrounding atmosphere, and the incoming green lumber packages are at a lower temperature than the ambient temperature within the end chambers. Each of the factors contributes to acidic condensation forming within the end chambers and accelerating corrosion.

Figure 1C:
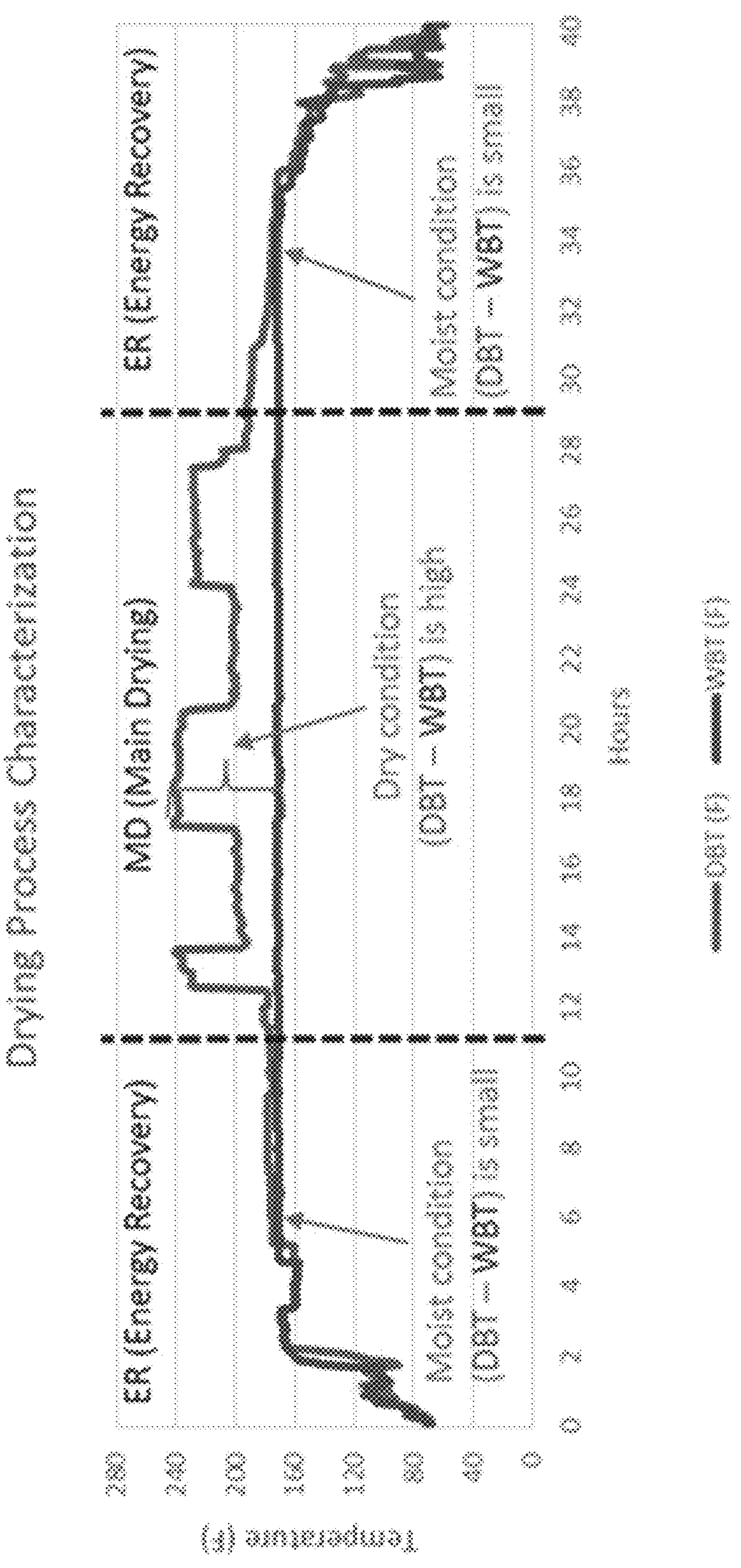
FIG. 1C is a graphical representation of exemplary dry bulb and wet bulb temperatures within the zones of a conventional continuous dry kiln.

FIG. 1C shows an exemplary comparison of the dry bulb temperature (DBT) and the wet bulb temperature (WBT) within the various zones of a conventional continuous dry kiln, including a main drying zone (e.g., the drying chamber 104) and to energy recovery zones (e.g., the first and second end chambers 102*a* and 102*b*). As shown in FIG. 1C, the difference between the DBT and the WBT within the main drying zone is adequate to prevent moisture formation through condensation of the drying gases. However, as the temperatures drop with high humidity in the energy recovery zones, the difference between the DBT and the WBT within the zones can become negligible, causing a small or zero wet bulb depression and corresponding condensation of the moisture within the gases within the energy recovery zones.

Figure 1D:
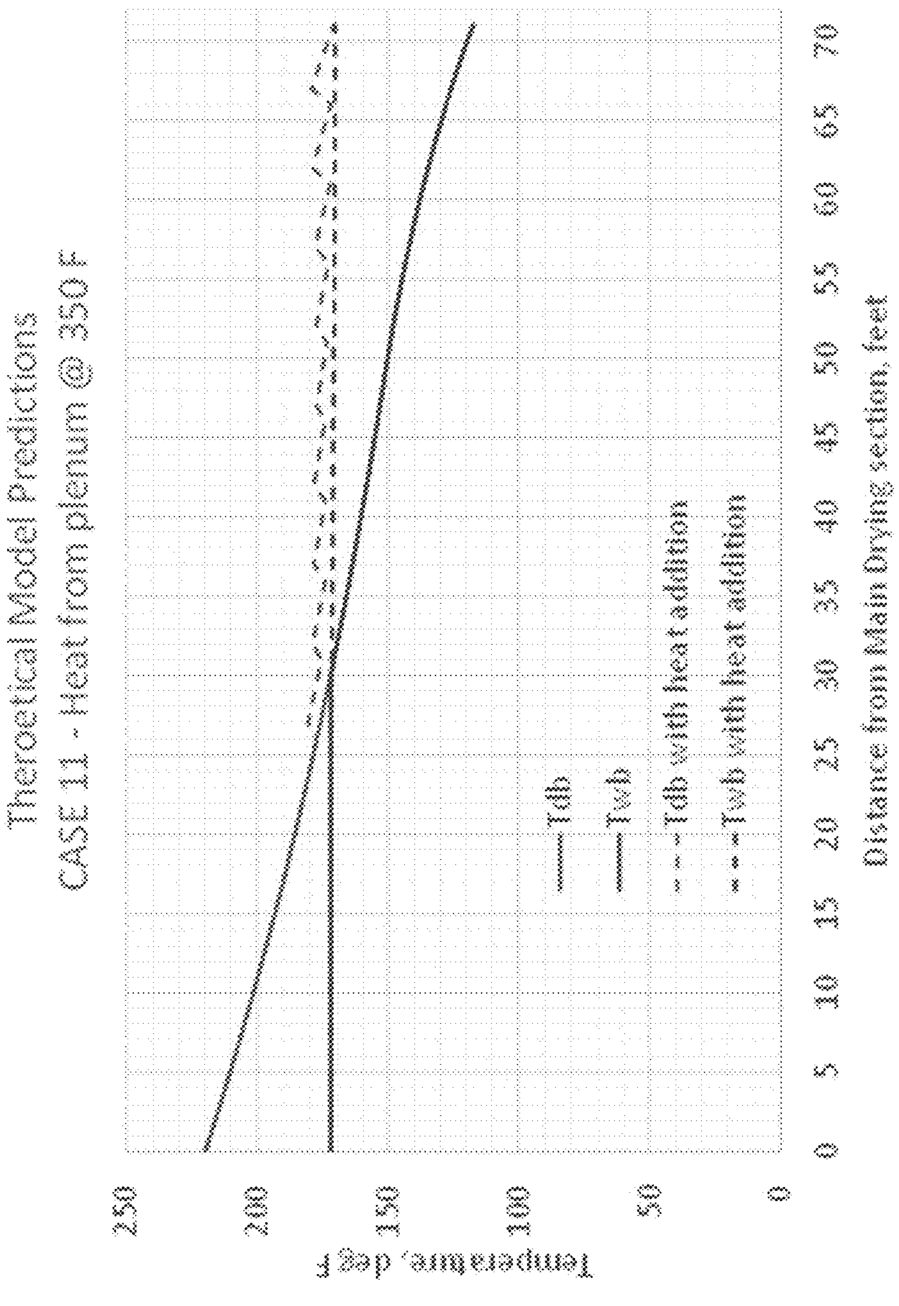
FIG. 1D is a graphical representation of exemplary projected dry bulb and wet bulb temperatures versus distance from the drying chamber within end chambers of continuous dry kiln structures in accordance with embodiments of the present technology.

The kilns 100 and 100' of the present technology include components configured to increase the DBT of the gases within the first and second end chambers 102*a* and 102*b* by directing a portion of the drying gas within the drying chamber distribution duct 146 through a first drying duct outlet 148*a* into a first end chamber distribution duct 158*a*, and through a second drying duct outlet 148*b* into a second end chamber distribution duct 158*b*. The first and second end chamber distribution ducts 158*a* and 158*b* each include distribution outlets (e.g., diffusers) through which heated gases 159*a* and 159*b*, respectively, flow into the end chambers 102*a* and 102*b* to increase wet bulb depression and reduce condensation of the gases therein. FIG. 1D shows the predicted dry bulb temperature (Tdb) and the wet bulb temperature (Twb) within the end chambers 102*a* and 102*b* of the kiln 100 and the end chamber 102*b* of the kiln 100' with respect to the distance from the drying chamber 104. As shown in FIG. 1D, without heat addition, Tdb and Twb converge at about 30 feet from the drying chamber 104 and cause condensation of the moisture within the end chambers 102*a* and 102*b* to the respective outlets. However, with heat addition, Tdb remains higher than Twb, causing a wet bulb depression through at least a majority of the length of the end chambers 102*a* and 102*b* to the outlets.

The end chamber distribution ducts 158*a* and 158*b* can be sized and configured to distribute an amount of the heated drying gas from the drying chamber distribution duct 146 such that a desired relative humidity level is variable and controllable within the first and second end chambers 102*a* and 102*b*, and can have one or more control valves (see FIG. 4) to regulate the quantity of heat transferred to the end chamber distribution ducts 158*a* and 158*b*. In some embodiments, the heat transferred by each of the end chamber distribution ducts 158*a* and 158*b* is between 5% and 10% of the heat transferred by the drying chamber distribution duct 146. It is expected that such heat transfer can be sufficient to maintain a wet bulb depression of about 5° F. or greater throughout the end chambers.

Conditioning and equalizing the lumber packages exiting the drying chamber 104 affects the final lumber moisture content, which is a critical characteristic contributing to the quality of dimension lumber. In one example, certain grades of dimension lumber have a target final lumber moisture content not exceeding 19%. For some other grades of lumber, the target final lumber moisture content can be more or less than 19%.

Figure 2A:
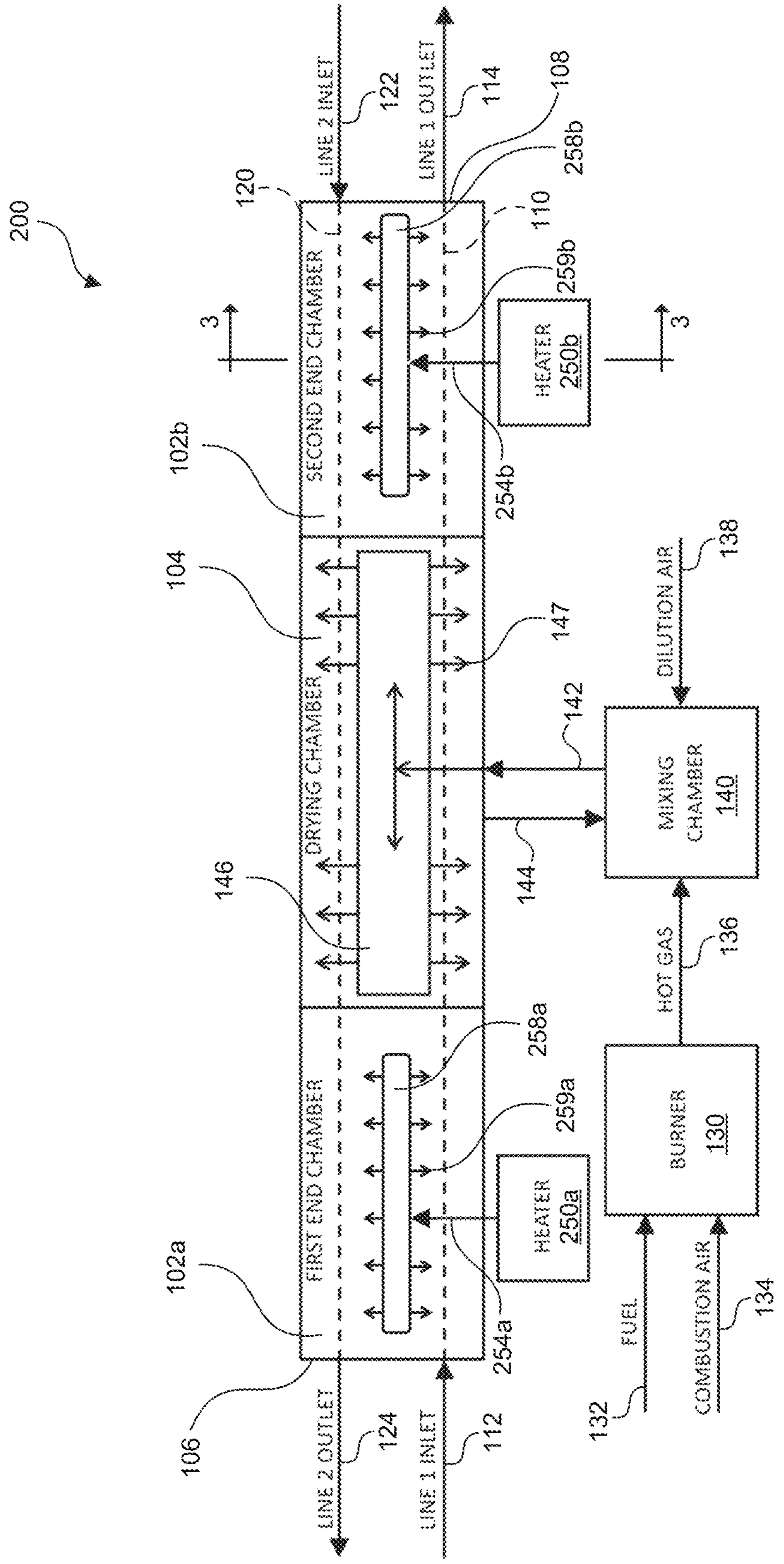
FIGS. 2A and 2B are flow diagrams of continuous dry kiln structures in accordance with embodiments of the present technology.
Figure 2B:
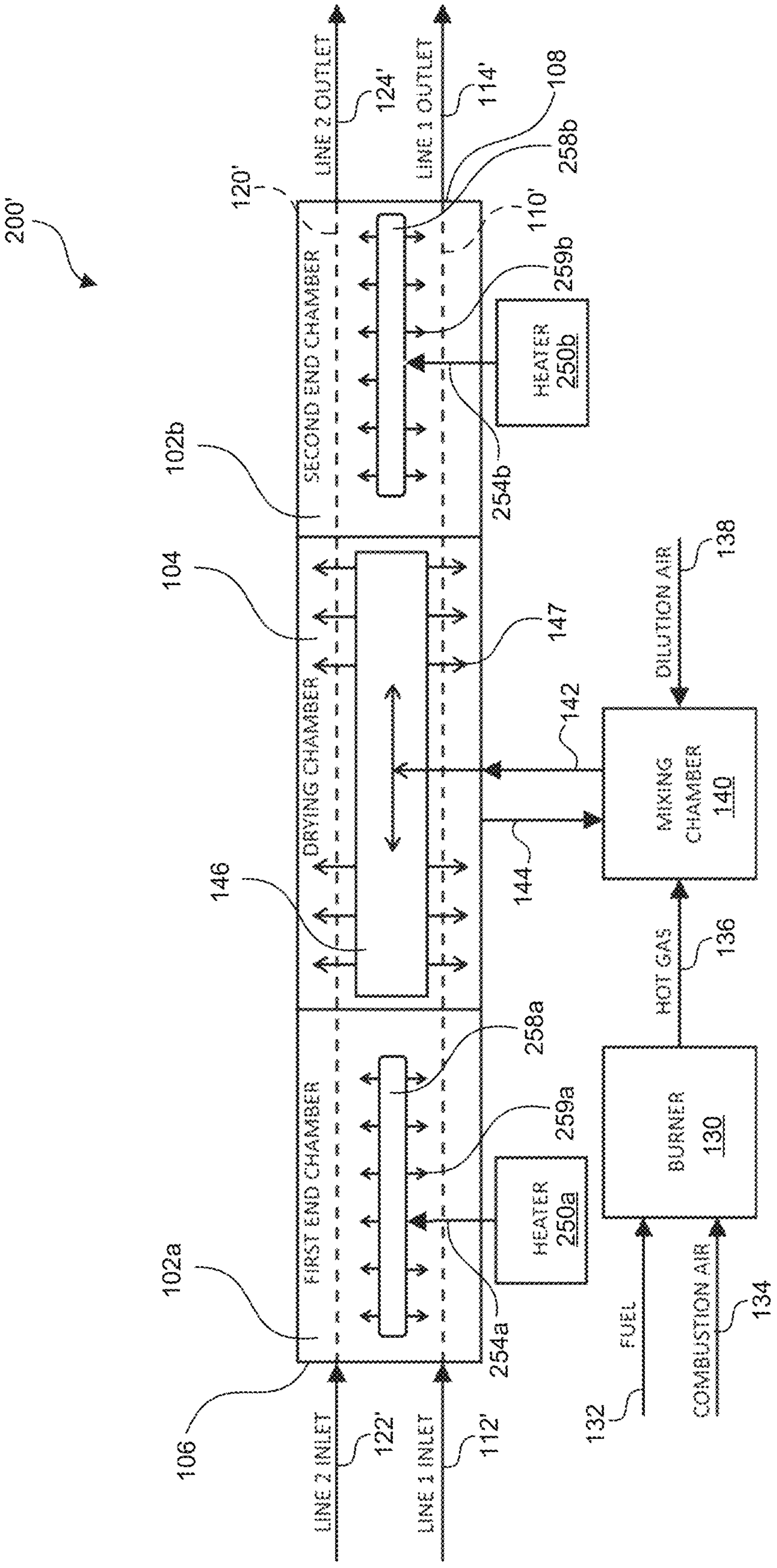

FIGS. 2A and 2B show flow diagrams of continuous dry kiln structures (FIG. 2A showing a kiln 200 having countercurrent lines, and FIG. 2B showing a kiln 200' having uniflow lines) in accordance with embodiments of the present technology. The kilns 200 and 200' are similar in structure and configuration to the kilns 100 and 100', respectively, of FIGS. 1A and 1B, except that the kilns 200 and 200' include a variation of the heated gas source for heat energy transfer into the conditioning chambers. Accordingly, like reference numbers refer to similar features in FIGS. 1A-2B, but may have variations and/or have different shapes and sizes. Features in the 200-series in FIGS. 2A and 2B correspond to features of the kilns 200 and 200' differing from features of the kilns 100 and 100', respectively.

The kilns 200 and 200' include a first heater 250*a* fluidly coupled through an inlet duct 254*a* to a first end chamber distribution duct 258*a* within the first end chamber 102*a*, and a second heater 250*b* fluidly coupled through an inlet duct 254*b* to a second end chamber distribution duct 258*b* within the second end chamber 102*b*. In embodiments having indirect heat energy distribution in the first and second end chambers 102*a* and 102*b*, the first and second heaters 250*a* and 250*b* and the first and second end chamber distribution ducts 258*a* and 258*b* can be replaced by end chamber heat distributors, e.g., heat exchangers (not shown), or a combination of end chamber distribution ducting and heat exchangers can be used. The configuration of the kilns 200 and 200' shown in FIGS. 2A and 2B omit the first and second drying duct outlets 148*a* and 148*b* of the kilns 100 and 100' and instead receive heat from the first and second heaters 250*a* and 250*b* to heat the first and second end chambers 102*a* and 102*b*. The first and second end chamber distribution ducts 258*a* and 258*b* each include outlets (e.g., diffusers) through which heated gases 259*a* and 259*b*, respectively, flow into the end chambers 102*a* and 102*b* to prevent condensation of the gases therein. The end chamber distribution ducts 258*a* and 258*b* can be sized and configured to distribute an amount of the heat from the first and second heaters 250*a* and 250*b* such that a desired relative humidity level is maintained within the first and second end chambers 102*a* and 102*b*. As with the burner 130, the first and second heaters 250*a* and 250*b* can provide heated gas by combusting green fuel, wood residuals, plant residuals, natural gas, propane, oil, coal, etc., or by providing heat using steam, hot oil, electric, solar, or other heating medium.

Figure 3:
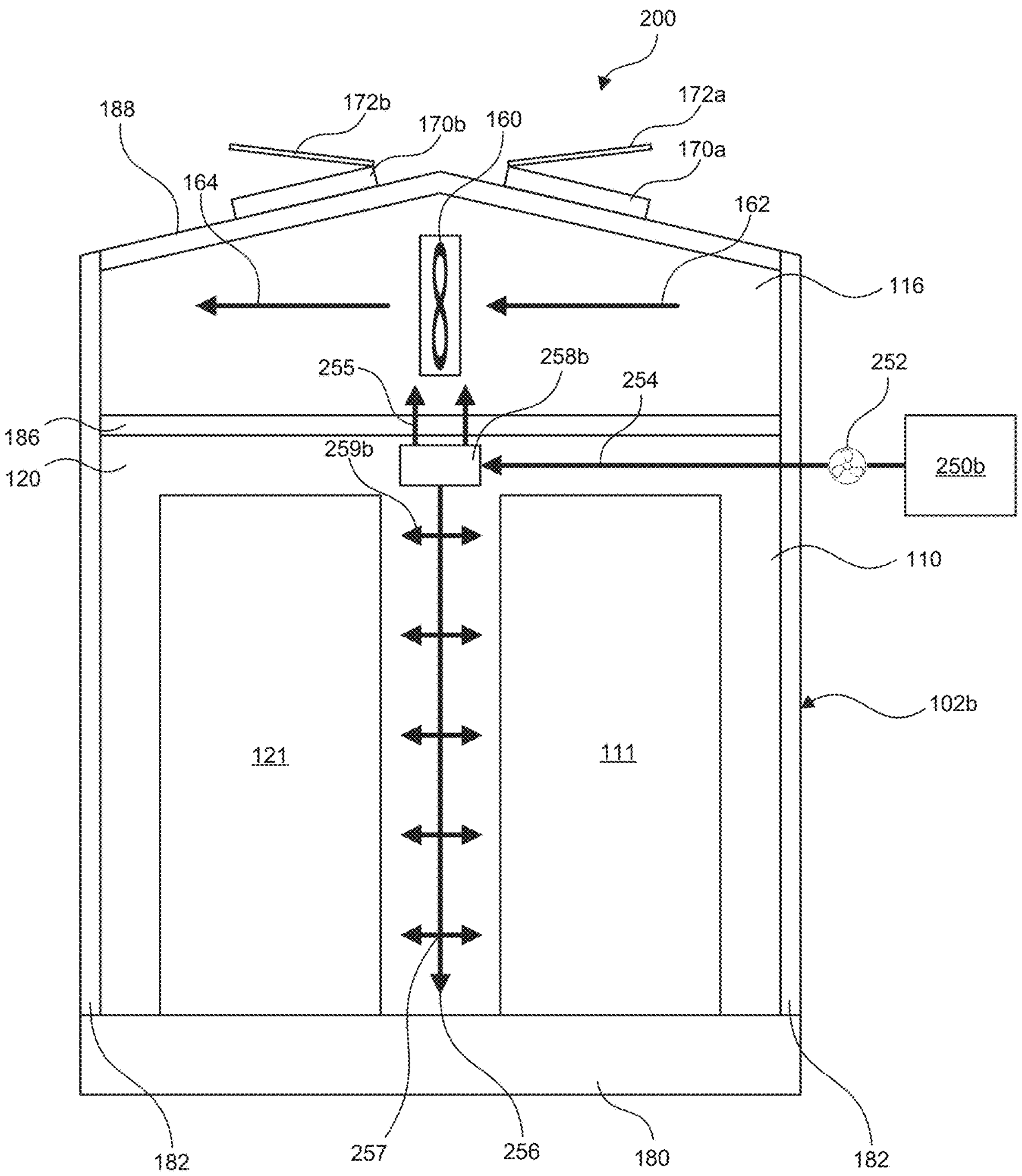
FIG. 3 is a cross-sectional view showing a portion of the continuous dry kiln structure taken along line 3-3 in FIG. 2A.

FIG. 3 is a cross-sectional view showing a portion of the kiln 200 taken along line 3-3 in FIG. 2A and similar configurations apply to the kilns 100, 100', and 200'. The kiln 200 includes the first line 110 and the second line 120, configured to transport the first lumber package 111 and the second lumber package 121, respectively. The kiln 200 includes a base 180 (e.g., a concrete foundation or the like), sidewalls 182, center columns (not shown), crossmembers 186, and roof 188. Other configurations of the structure of the kiln 200 are also within the scope of the present technology. The heat generated by the second heater 250*b* is delivered through the inlet duct 254 by a duct fan 252. After passing through an opening in the sidewall 182, the heat travels to the second end chamber distribution duct 258*b*, exhausting the heated gas 259*b* into the second end chamber 102*b* of the structure of the kiln 200. The second end chamber distribution duct 258*b* includes an opening 255 (e.g., a vent) directing a portion of heated gas upward and a distribution duct 256 directing the heated gas 259*b* downward, the distribution duct 256 including a plurality of lateral distribution outlets 257 to direct the heated gas 259*b* toward the first and second lumber packages 111 and 121. Although five lateral distribution outlets 257 having bilateral exhaust directions are shown in FIG. 3, any number of lateral distribution outlets 257 can be used and the lateral distribution outlets 257 may be configured to exhaust the heated gas 259*b* in any direction. In embodiments having indirect heat energy distribution in the second end chamber 102*b*, the second heater 250*b*, the inlet duct 254, the duct fan 252, and the second end chamber distribution duct 258*b*, and the distribution duct 256 can be omitted and replaced by end chamber heat distributors, e.g., heat exchangers (not shown), or a combination of end chamber distribution ducting and heat exchangers can be used. The end chambers 102*a* and 102*b* may further include sensors (see FIG. 4) to determine the dry bulb and wet bulb temperatures within the end chambers for control of the heat distribution.

Gases in the upper region 116 are drawn into a crossflow fan 160 in the direction of the inlet arrow 162 and proceed in the direction of the outlet air 164, which circulates the heated gas within the second end chamber 102*b*. Such circulation of air allows greater homogenization and stability of the temperature and humidity of the gases within the end chambers, which increases the efficiency of preheating the incoming green lumber packages and conditioning/equalizing the outgoing dried lumber packages. In embodiments of the kiln 200 where excess humidity removal from the end chambers is desired, first and second vents 170*a* and 170*b* can be positioned through the roof 188 and configured to expel moist gas from the end chambers 102*a* and 102*b*. The moist gas may be selectively vented out of the end chambers 102*a* and 102*b* by opening vent lids 172*a* and 172*b*. Out-venting can reduce the heat transfer energy requirement to the end chambers by the drying chamber distribution duct 146, the heaters 250*a* and 250*b*, and/or other suitable sources.

Figure 4:
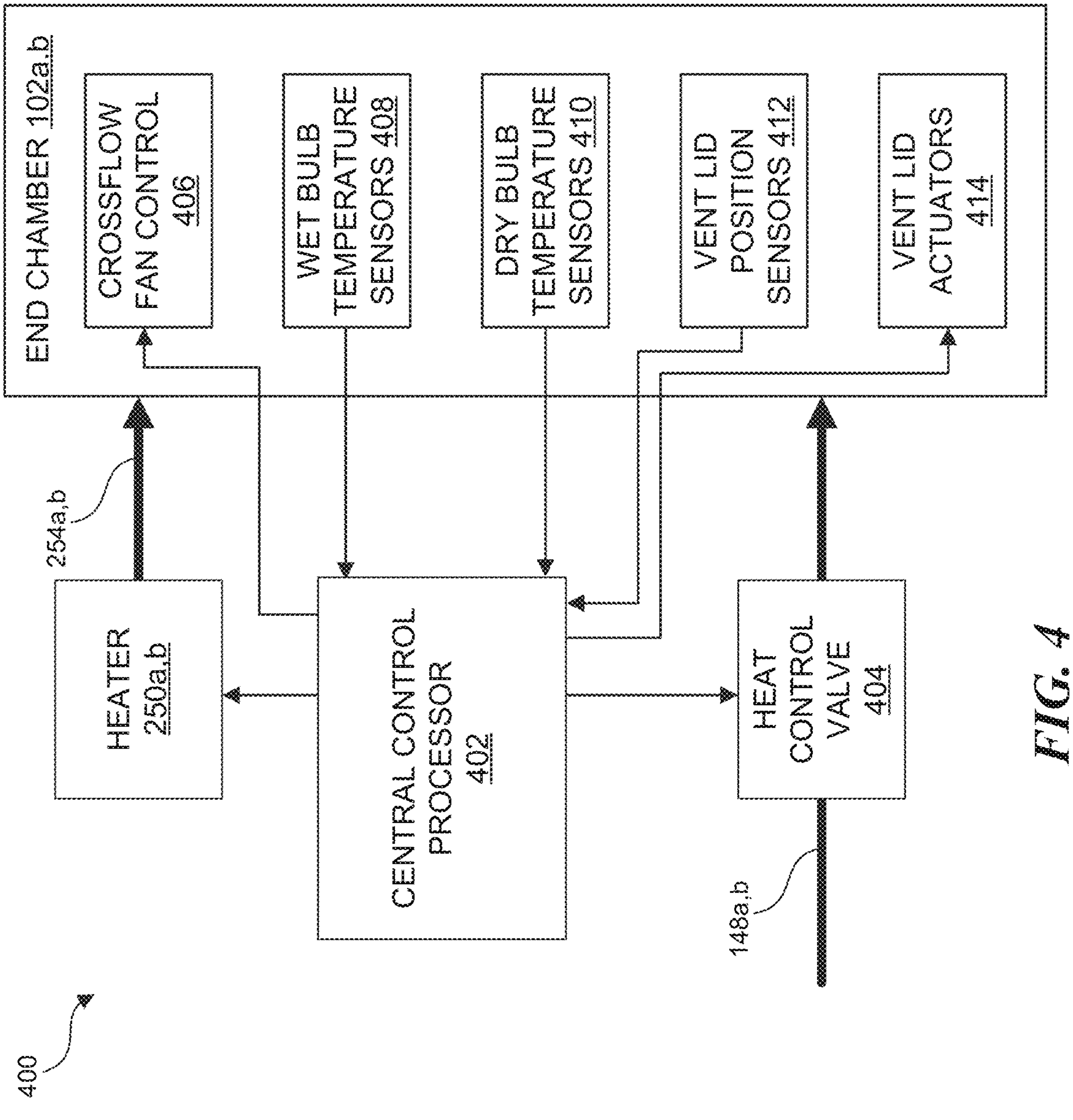
FIG. 4 is a schematic view of a control system for a continuous dry kiln structure in accordance with embodiments of the present technology.

FIG. 4 is a block diagram showing a schematic view of a control system for the kilns 100/100'/200/200' in accordance with embodiments of the present technology. Any kiln having the features described above with reference to FIGS. 1A-3 can include one or more control systems to operate various features of the kiln, a representative example of which is a control system 400 shown schematically in FIG. 4. The control system 400 includes a central control processor 402 configured to control one or more aspects of the kiln and may include other controls in addition to those shown in FIG. 4. In kilns 100 and 100', the central control processor 402 is operatively coupled (e.g., electrically, wirelessly, etc.) to a control valve 404 positioned in the first and second drying duct outlets 148*a* and 148*b* (see FIGS. 1A and 1B) to regulate the flow of heated gas from the drying chamber distribution duct 146 to the first and second end chamber distribution ducts 158*a* and 158*b*. In kilns 200 and 200', the central control processor 402 is operatively coupled to the first and second heaters 250*a* and 250*b* (see FIGS. 2A and 2B) to regulate heat from the first and second heaters 250*a* and 250*b* to the first and second end chamber distribution ducts 158*a* and 158*b*. The control system 400 also has components associated with the end chambers 102*a* and 102*b*, including a crossflow fan control 406, a wet bulb temperature sensor 408, a dry bulb temperature sensor 410, a vent lid position sensor 412, and a ventilated actuator 414. The sensors 408, 410, and 412 are in communication with the central control processor 402 (e.g., electrically, wirelessly, etc.) and configured to provide signals to the central control processor 402 to control the heat control valve 404, crossflow fan control 406, and the vent lid actuators 414, each also operatively coupled to the central control processor 402. A plurality of wet and dry bulb temperature sensors 408 and 410 may be positioned along the length of the and chambers 102*a* and 102*b* to provide readings at various positions.

In one example, the central control processor 402 may compare the difference between the dry bulb temperature provided by the dry bulb temperature sensor 410 and the wet bulb temperature provided by the wet bulb temperature sensor 408 to calculate a wet bulb depression. If the wet bulb depression is below a threshold value (e.g., 5°), the central control processor 402 sends a signal to: (1) the heat control valve 404 to open and provide additional heat to the end chambers 102*a* and 102*b*; (2) the first and second heaters 250*a* and 250*b* to provide additional heat to the end chambers 102*a* and 102*b*; (3) the crossflow fan control 406 to change the speed of the crossflow fan 160; and/or (3) the ventilated actuators 414 to change the position of the vent lids 172*a* and 172*b*.

As used in the foregoing description, the terms "vertical," "lateral," "upper," "lower," etc. can refer to relative directions or positions of features in the present technology in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, left/right, and distal/proximate can be interchanged depending on the orientation. Moreover, for ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

The foregoing disclosure may also reference quantities and numbers. Unless specifically stated, such quantities and numbers are not to be considered restrictive, but exemplary of the possible quantities or numbers associated with the present technology. Also, in this regard, the present disclosure may use the term "plurality" to reference a quantity or number. In this regard, the term "plurality" is meant to be any number that is more than one, for example, two, three, four, five, etc. For the purposes of the present disclosure, the phrase "at least one of A, B, and C," for example, means (A), (B), (C), (A and B), (A and C), (B and C), or (A, B, and C), including all further possible permutations when greater than three elements are listed.

From the foregoing, it will be appreciated that specific embodiments of the present technology have been described herein for purposes of illustration, but that various modifications may be made without deviating from the present disclosure. Accordingly, the present technology is not limited except as by the appended claims. Furthermore, certain aspects of the present technology described in the context of particular embodiments may also be combined or eliminated in other embodiments. For example, another dry kiln system in accordance with the present technology can include both the first and second drying duct outlets 148*a* and 148*b* of FIGS. 1A and 1B to provide heated gas from the drying chamber and the separate independent heaters 250*a* and 250*b* of FIGS. 2A and 2B with associated ducting to provide additional heat. Moreover, although advantages associated with certain embodiments of the present technology have been described in the context of those embodiments, other embodiments may also exhibit such advantages and not all embodiments need necessarily exhibit such advantages to fall within the scope of the present disclosure. Accordingly, the present disclosure and associated technology can encompass other embodiments not expressly shown or described herein.

We claim:

1. A kiln for drying and processing lumber packages, the kiln comprising:

a drying chamber;

a first end chamber at an end of the drying chamber;

a second end chamber at an opposing end of the drying chamber;

a first lumber conveying line configured to transport lumber packages in a first direction through the first end chamber, the drying chamber and the second end chamber;

a second lumber conveying line configured to transport lumber packages in a second direction through the first end chamber, the drying chamber and the second end chamber; and a heat distributor system having (a) a drying chamber distribution duct in the drying chamber configured to receive heat from a heater, (b) a first end chamber distribution duct in the first end chamber configured to receive heat from the drying chamber distribution duct and transfer the received heat to the first end chamber, and (c) a second end chamber distribution duct in the second end chamber configured to receive heat from the drying chamber distribution duct and transfer the received heat to the second end chamber.

2. The kiln of claim 1, wherein the second direction is opposite from the first direction.

3. The kiln of claim 1, further comprising a vent positioned in a roof of the first end chamber and a vent lid configured to selectively expel moist gas from the first end chamber, wherein the vent lid is operable by a vent lid actuator operatively coupled to a central control processor.

4. The kiln of claim 1, further comprising a wet bulb temperature sensor and a dry bulb temperature sensor in the first end chamber in communication with a central control processor.

5. The kiln of claim 1, further comprising:

a first drying duct outlet coupled to the drying chamber distribution duct and the first end chamber distribution duct; and a second drying duct outlet coupled to the drying chamber distribution duct and the second end chamber distribution duct.

6. The kiln of claim 1, wherein the first and second lumber conveying lines are configured to transport the lumber packages in the same direction.

7. The kiln of claim 5, wherein the first and second end chamber distribution ducts comprise first and second diffusers, respectively.

8. The kiln of claim 1, further comprising a first vent having a first vent lid and positioned in a roof of the first end chamber, a second vent having a second vent lid and positioned in a roof of the second end chamber, wherein the first and second vent lids are configured to selectively expel moist gas from the first and second end chambers, respectively, and wherein the first and second vent lids are operable by first and second vent lid actuators operatively coupled to a central control processor.

* * * * *